W. G. WINANS.
TRUCK.
APPLICATION FILED MAR. 13, 1911.

1,006,891.

Patented Oct. 24, 1911.

Witnesses:
H. J. Gettings.
R. L. McDonnell.

Inventor:
Wesley G. Winans
by Lynch & Dorer
his Attorneys.

UNITED STATES PATENT OFFICE.

WESLEY G. WINANS, OF KANSAS CITY, MISSOURI.

TRUCK.

1,006,891.  Specification of Letters Patent.  Patented Oct. 24, 1911.

Application filed March 13, 1911. Serial No. 614,262.

*To all whom it may concern:*

Be it known that I, WESLEY G. WINANS, a citizen of the United States of America, residing at Kansas City, in the county of Jackson and State of Missouri, have invented certain new and useful Improvements in Trucks; and I hereby declare the following to be a full, clear, and exact description of the invention, such as will enable others skilled in the art to which it pertains to make and use the same.

This invention relates to new and useful improvements in trucks.

The object of this invention is to provide a truck which will be simple in construction, durable and by means of which heavy loads can be handled by a single operator.

With this object in view my invention consists in the features of construction and combination of parts described in the specification, pointed out in the claims and illustrated in the accompanying drawings.

Figure 1:
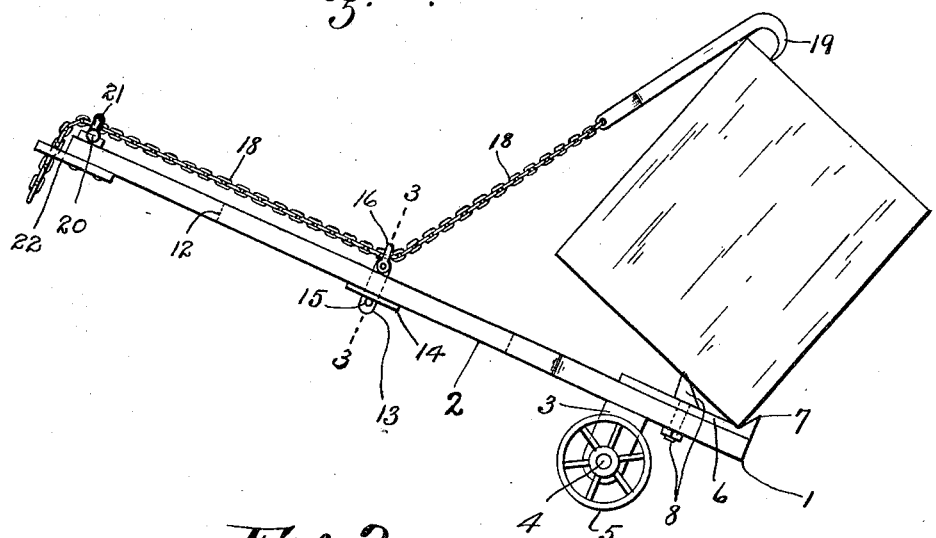
Figure 2:
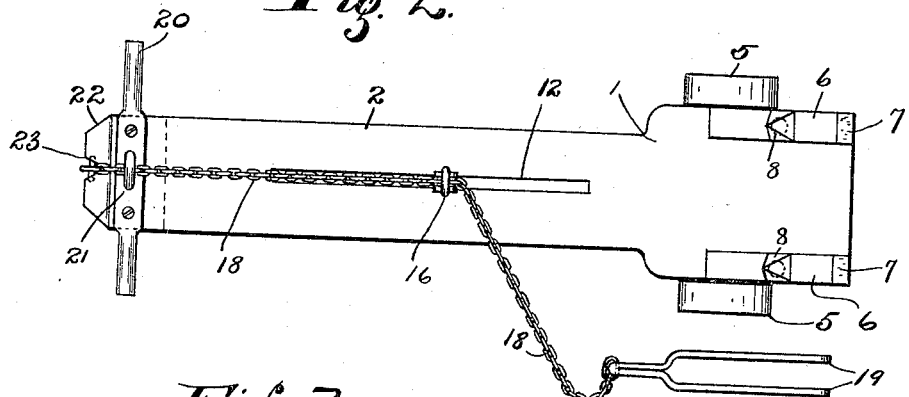
Figure 3:
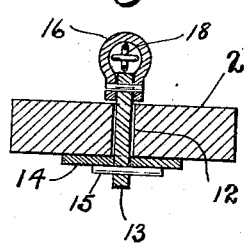
Figure 4:
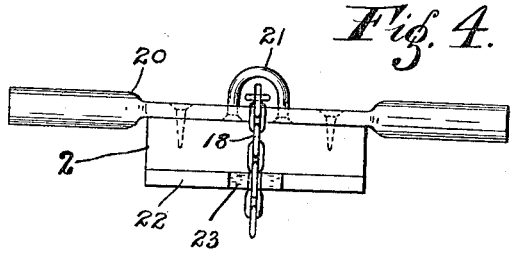

In the accompanying drawings Figure 1 is a side elevation of my improved truck with a load thereon. Fig. 2 is a top plan of the truck. Fig. 3 is a section on line 3—3, Fig. 2, on twice the scale. Fig. 4 is a view of the end of the handle.

Again referring to the drawings 1 represents the platform of the truck, which is preferably spade-shaped as is customary in trucks of this kind, and is provided with a handle portion 2 which is preferably formed integral with the platform portion. On the under side of the platform 1 are secured mountings 3 for the axle 4 which carries wheels 5 of the usual description. At the front edge of the platform 1, at each side thereof, is mounted a reinforcing plate 6 which strengthens the front end of the platform. The plates 6 are provided at their forward ends with upwardly projecting flanges having sharp flat edges, which when the truck is being used are inserted beneath the box or other article which is to be placed on the truck to give the initial lift to the box, and after the box is on the truck prevent the box from sliding off of it. Each plate 6 is secured to the platform 1 by a bolt 8 which passes down through the said plate and the platform. The heads of said bolts are pointed or spike-shaped and are adapted to engage and slightly penetrate the outer surface of the box after it has been placed on the truck in order to more firmly hold the box on the truck.

In the handle portion 2 is formed a longitudinally extending slot 12 which extends almost the full length of the handle but does not extend quite to the end thereof. In the slot 12 is slidably arranged a flat bar 13 which is made sufficiently long so that it extends entirely through the said slot 12 and projects beyond the upper and lower surfaces of the handle. On the lower end of the bar is slipped a small plate or washer 14 and in the bar 13 under the washer is inserted a pin 15 which serves as a lock pin to prevent the bar 13 from being drawn up through the said slot 12. To the upper end of the bar 13 is pivotally secured a metallic loop or clevis 16. A chain 18 is passed through the clevis 16 and to the lower end thereof is secured a pair of hooks 19, the said hooks being preferably spaced a short distance apart, but having their shank portions rigidly connected. At the upper end of the handle is secured a metal bar 20 which projects beyond each side of the handle to form hand grips. At the upper end of the handle, and as shown in the drawings, mounted on the bar 20, is a strap 21 which forms a guard or keeper for the upper portion of the chain 18. At the upper end of the handle, and preferably on the under side thereof, is secured a catch for engaging the chain and locking it securely to the end of the handle. This catch consists of a metallic plate 22 having a V-shaped notch or groove 23 therein.

The operation of my truck is as follows: The truck is brought close to the article which is to be carried thereon and the flanges at the front edge of the platform are inserted beneath the article. The hooks on the end of the chain are then thrown over the top of the article and caused to engage therewith and the upper end of the chain is forced down into the notch in the locking plate or latch, then by moving the adjustable clevis up or down in the slot the chain can be drawn taut and when the chain is taut the handle of the truck is pressed down and the chain lifts the article from the ground and tips it over onto the platform where it is engaged by the spiked-shaped heads on the bolts 8 and balances on the front of the truck. In this way the handle of the truck is used as a lever for lifting the article on to the truck and therefore very heavy loads can be easily and quickly handled by one operator.

What I claim is,—

1. In a truck, a platform, wheels arranged on said platform, a handle connected with said platform, a chain provided with means at one end for engaging with the load which is to be carried on the truck, means arranged on the handle for engaging the other end of said chain and a member mounted on the handle and slidable longitudinally thereof and adapted to engage said chain.

2. In a truck, a platform, wheels arranged on said platform, a handle connected with said platform, said handle being provided with a longitudinally extending slot, a chain provided with means at one end for engaging with the load which is to be carried on the truck, a bar slidably secured in said slot and provided at one end with means for engaging said chain and means arranged at the upper end of said handle for engaging with the free end of the chain.

3. In a truck, a platform, wheels arranged on said platform, a handle connected with said platform and provided with a longitudinally extending slot, a bar slidably arranged in the slot in the handle so as to extend through said slot at each side of the handle, means arranged at the lower end of said bar for holding said bar in said slot, a loop arranged on the upper end of said bar and a chain provided with hooks at one end and having its other end carried through the loop on said bar and secured at the upper end of said handle.

4. In a truck, a platform, wheels arranged on said platform, a handle formed integral with said platform, said handle being provided with a longitudinal slot, a bar slidably arranged in the slot in the handle so as to extend through said slot at each side of the handle, means arranged at the lower end of said bar for holding said bar in said slot, a loop arranged on the upper end of said bar, a chain provided with hooks at one end and having its other end carried through the loop on said bar and a plate secured at the upper end of said handle and provided with a notch adapted to receive the end of said chain.

In testimony whereof, I sign the foregoing specification, in the presence of two witnesses.

WESLEY G. WINANS.

Witnesses:
B. E. NEWTON,
T. A. KEELEY.

---

Copies of this patent may be obtained for five cents each, by addressing the "Commissioner of Patents, Washington, D. C."